US008540476B2

(12) United States Patent
Moulton

(10) Patent No.: US 8,540,476 B2
(45) Date of Patent: Sep. 24, 2013

(54) PIPETTE TIP LOADER AND TRANSPORTER

(75) Inventor: Thomas Moulton, San Francisco, CA (US)

(73) Assignee: Labcon, North America, Petaluma, CA (US)

(*) Notice: Subject to any disclaimer, the term of this patent is extended or adjusted under 35 U.S.C. 154(b) by 744 days.

(21) Appl. No.: 11/868,846

(22) Filed: Oct. 8, 2007

(65) Prior Publication Data

US 2009/0092520 A1 Apr. 9, 2009

(51) Int. Cl.

| | |
|---|---|
| ***B65G 61/00*** | (2006.01) |
| ***B65G 57/00*** | (2006.01) |
| ***B65D 85/20*** | (2006.01) |
| ***B65D 21/00*** | (2006.01) |
| ***B01L 9/00*** | (2006.01) |
| ***A47F 1/04*** | (2006.01) |
| ***A47B 57/00*** | (2006.01) |
| *B65H 1/00* | (2006.01) |
| *B65D 1/34* | (2006.01) |
| *B01L 3/02* | (2006.01) |
| *G01N 21/75* | (2006.01) |
| *A47F 5/08* | (2006.01) |
| *A47F 7/00* | (2006.01) |
| *B65G 59/00* | (2006.01) |

(52) U.S. Cl.

USPC .................. 414/802; 414/222.01; 414/222.04; 414/225.01; 414/795.7; 414/801; 414/788; 422/400; 422/524; 422/526; 422/564; 206/443; 206/503; 206/506; 206/507; 206/561; 206/562; 206/563; 211/60.1; 211/88.01; 211/194

(58) Field of Classification Search

USPC .......................................................... 414/802

See application file for complete search history.

(56) References Cited

U.S. PATENT DOCUMENTS

| | | | | |
|---|---|---|---|---|
| 5,487,997 | A * | 1/1996 | Stolp | 436/54 |
| 6,513,705 | B1 * | 2/2003 | Sheffer | 229/178 |
| 6,534,015 | B1 * | 3/2003 | Viot et al. | 422/564 |
| 7,060,226 | B1 * | 6/2006 | Jessop et al. | 422/526 |
| 2009/0061126 | A1 * | 3/2009 | Knoerzer et al. | 428/34.3 |

FOREIGN PATENT DOCUMENTS

FR 2726201 A1 * 5/1996

* cited by examiner

*Primary Examiner* — Brian J. Sines

*Assistant Examiner* — Jennifer Wecker

(74) *Attorney, Agent, or Firm* — Vierra Magen Marcus LLP

(57) ABSTRACT

Embodiments of the invention relate to a system for storing and/or transporting platforms of pipette tips. The system includes packaging in which a stacked tower of platforms may be transported. Embodiments of the present invention further include a loader for transferring platforms from the packaging to a rack for holding pipette tips platforms. The loader transfers the platforms by accessing the uppermost platform in the stack.

18 Claims, 6 Drawing Sheets

PIPETTE TIP LOADER AND TRANSPORTER

BACKGROUND OF THE INVENTION

1. Field of the Invention

The present invention relates to a pipette tip transport and loading system.

2. Description of the Related Art

Pipette tips are widely used in chemistry, biomedical and bioengineering testing for transporting and dispensing discrete amounts of a liquid sample. A typical pipette tip is made of plastic and formed with a substantially conical head and a frustoconical body. In most applications, pipette tips are used in large quantities, making individual handling of the pipette tips highly inconvenient. Consequently, pipette tips are typically loaded into pipette tip platforms so that the user need not handle the pipette tips individually. By utilizing platform loading, liquid samples can be efficiently stored and transported in large quantities.

Platforms of pipette tips are often stacked and packaged one atop the other. For example, refill packs are sold including a tower of stacked platforms, packaged within a housing. Typically, some sort of device is used to transfer platforms from the stack and to deposit a platform into a pipette tip rack, one platform per rack. Standard pipette tip racks and platforms typically have a rectangular upper surface which defines an array of apertures. In a rack, liquid samples may be transferred to and/or from pipette tips in the rack from an array of pipettors.

A number of devices have been developed that facilitate unloading pipette tip platforms from a stack of pipette tip platforms. U.S. Pat. Nos. 5,392,914, 5,441,702, 5,612,000 and 6,007,779 to Lemieux et al., and U.S. Pat. No. 5,779,984 to Kelly et al. each describe refill packs for pipette tip racks. The refill packs described in those patents enclose stacks of pipette tip platforms in a box-like packaging having an open lower end from which the pipette tips in the lowest platform in the stack extend. The packaging is grasped by the user and the pipette tips in the lowermost platform are manually fitted into a pipette tip rack. The pipette tip platforms are held within the rack by a flange extending around the perimeter of the open end of the refill pack. When the packaging is pressed downwardly, the flange is deformed outwardly by the downward force exerted by the lowermost pipette tip platform, and the platform is forced through the flange and remains on the rack. Once the platform has passed through the flange, the flange elastically returns to its original position, retaining the rest of the pipette tip platforms within the packaging.

There exists a continuing need for alternative, reusable loading devices which can dispense units of platform-loaded goods in a single dispensing action, and can be simply and reliably operated.

SUMMARY

Embodiments of the invention relate to a system for storing and/or transporting platforms of pipette tips. The system includes packaging in which a stacked tower of platforms may be transported. The packaging and platforms may for example be a refill pack of disposable pipette tips. The packaging may include first and second sides each of which forms a partial enclosure. The sides may be folded upward to overlap each other, thereby forming a complete enclosure around the tower of pipette tip platforms. From a sealed position, the respective sides may fold down until the sides are flat, leaving the tower of platforms accessible at every level.

Embodiments of the present invention further include a loader for transferring platforms from the packaging to a rack for holding pipette tip platforms. The loader in general may be formed of a clear, semi-rigid, thermoplastic polymer resin having a degree of elasticity. The loader includes a top surface and four downwardly extending sides. A lower portion of the sides may flare outward. The loader further includes indentations formed within a pair of opposed sides of the loader. The indentations define shelves on an interior of the loader. The loader and the respective shelves within the loader are sized so that, when the loader is in an unbiased position, a platform is able to fit within the interior of the loader with edge portions of the platform supported on each of the shelves. When in this position, the loader is able to transport a platform of pipette tips away from the packaging.

Once a platform of pipette tips is loaded into the loader, the loader may transport the platform to a pipette tip rack of known construction. As the loader moves down over the rack, the flared edges in the sides of the loader will form a line of engaging contact with peripheral edges of the rack. Upon continued downward movement of the loader, the peripheral edges of the rack will elastically force the flared portions and sides outward away from each other. This spreading apart of the sides pulls the shelves out from under the platform to release the platform to the rack.

This type of offload of platforms presents advantages over other types of transport loaders in that a platform is extricated from the loader using a downward force and motion while the platform is securely positioned within the rack. This minimizes the possibility that pipette tips will get jostled and/or dislodged from the platform.

DETAILED DESCRIPTION

Embodiments of the present invention will now be described with reference to FIGS. 1 through 8, which in general relate to a rack for pipette tips. It is understood that the present invention may be embodied in many different forms and should not be construed to being limited to the embodiments set forth herein. Rather, these embodiments are provided so that this disclosure will be thorough and complete and will fully convey embodiments of the invention to those skilled in the art. Indeed, the invention is intended to cover alternatives, modifications and equivalents of these embodiments, which are included within the scope and spirit of the invention as defined by the appended claims. Furthermore, in the following detailed description of embodiments of the present invention, numerous specific details are set forth in order to provide a thorough understanding of the present invention. However, it will be clear to those with ordinary skill in the art that the present invention may be practiced without such specific details.

Figure 1:
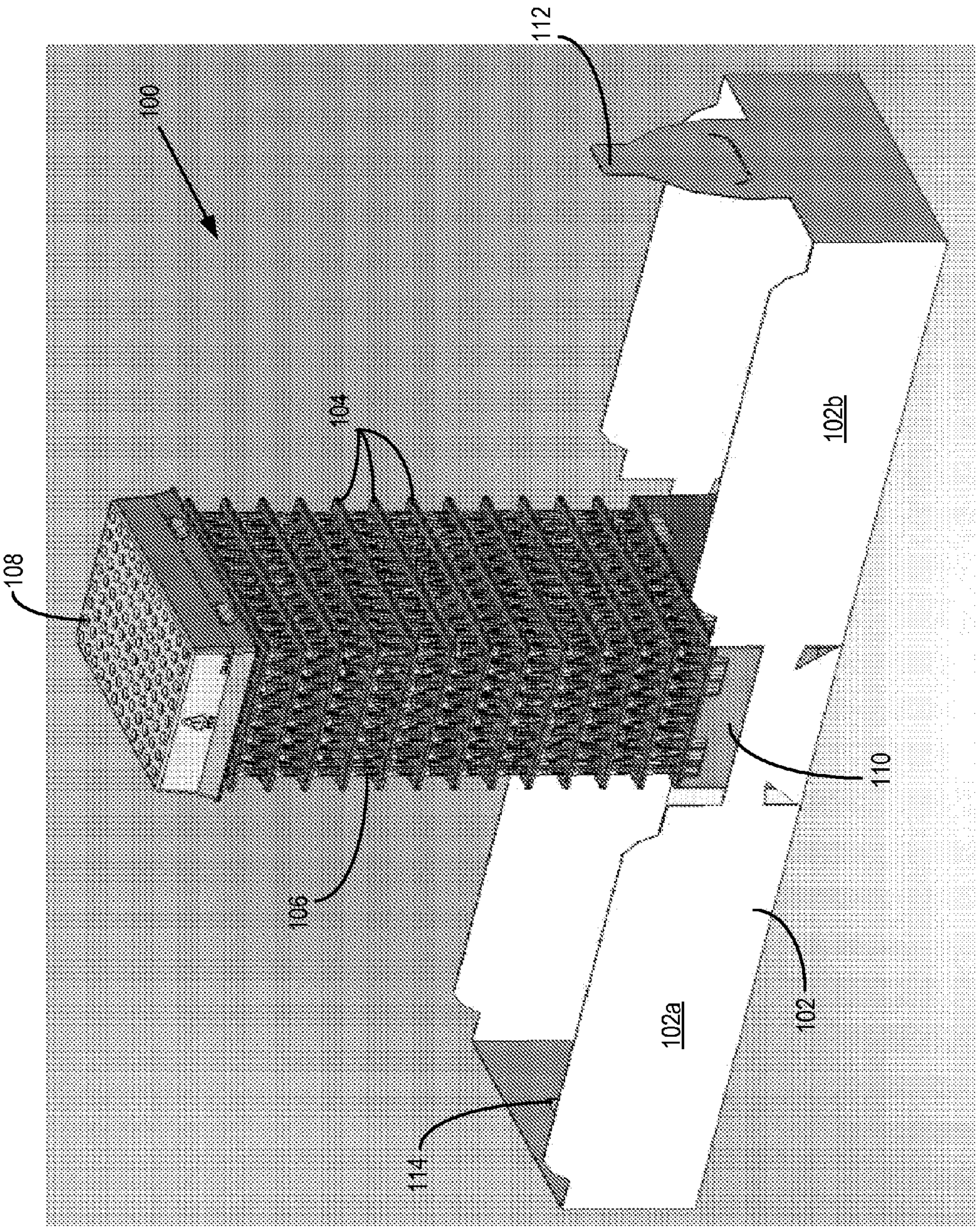
FIG. 1 is a perspective view of a stack of pipette tip platforms including stacked pipette tips seated within a transport packaging and including a loader, all according to embodiments of the present invention.
Figure 2:
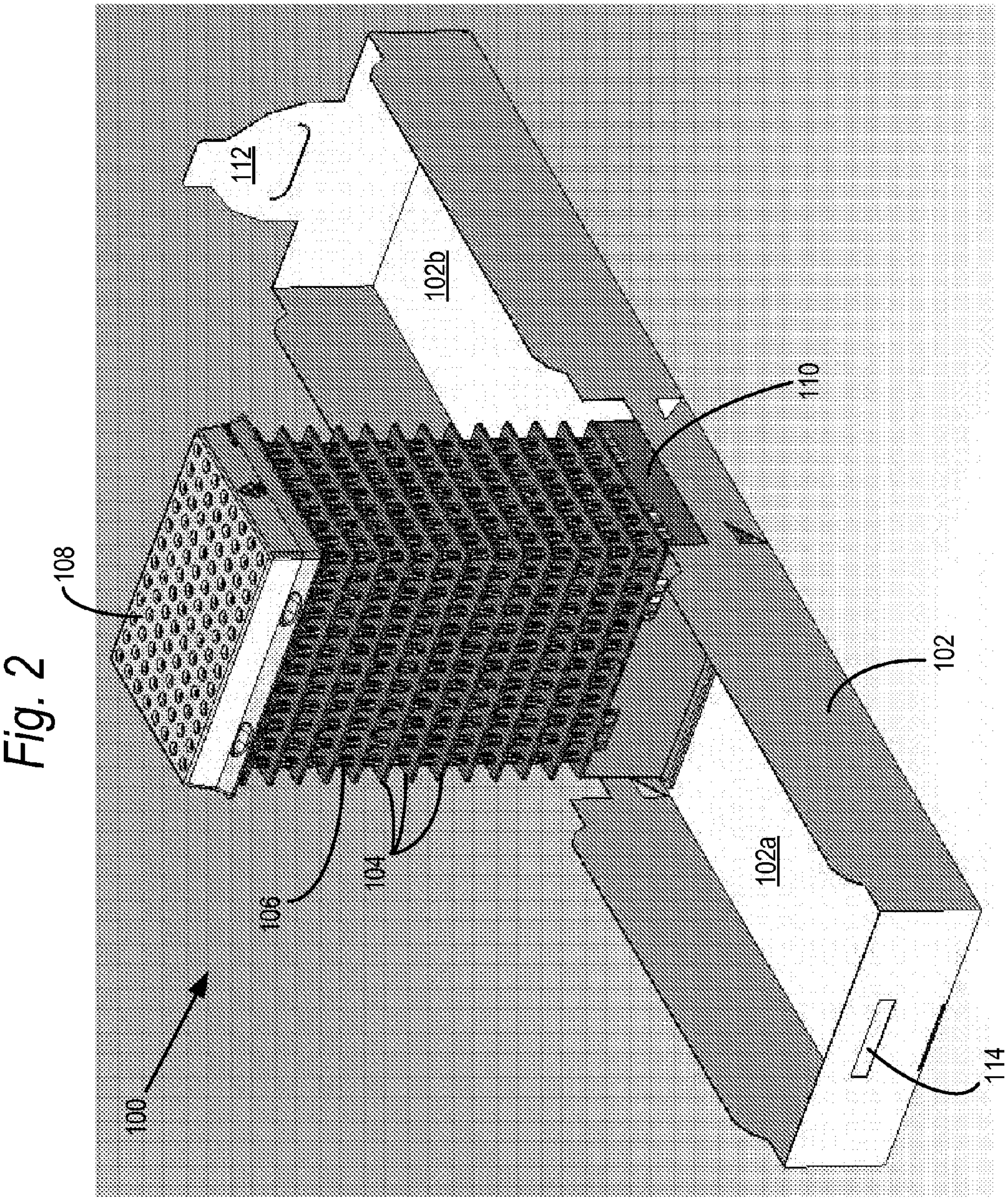
FIG. 2 is an alternative perspective view of a stack of pipette tip platforms including stacked pipette tips seated within a transport packaging and including a loader, all according to embodiments of the present invention.

FIGS. 1 and 2 are different perspective views of a system 100 for transporting pipette tips according to embodiments of the present invention. System 100 includes packaging 102 for transporting a tower of stacked pipette tip platforms 104, each of which includes an array of pipette tips 106. The system 100 further includes a pipette tip loader 108 for transferring pipette tip platforms 104 from packaging 102 as described hereinafter. The bottom-most platform 104 in packaging 102 may include pipette tips 106 seated within a shipping base 110 of known construction which includes an array of apertures for receiving the array of pipette tips 106 in the lower-most platform 104. The shipping base may be biodegradable, sustainable and/or recyclable.

In embodiments, the packaging 102 and its contents may be a refill pack of disposable pipette tips, but it is understood that the packaging 102 need not be a refill pack in alternative embodiments. Moreover, packaging 102 need not house a loader 108 in embodiments, but rather operate with a loader 108 that is not transported within the packaging 102. As seen in FIGS. 1 and 2, packaging 102 includes first and second sides 102*a* and 102*b*, shown in the open position in FIGS. 1 and 2. Each of sides 102*a* and 102*b* forms a partial enclosure, and may be folded upward to overlap each other, thereby forming a complete enclosure around the tower of pipette tip platforms 104, loader 108 and shipping base 110. From a sealed position, the respective sides 102*a* and 102*b* may fold down 90° until the sides are flat, leaving the tower of platforms 104 accessible at every level. The sides 102*a* and 102*b* may be returned to a closed position by manually pushing the sides back to their upright positions.

The sides 102*a* and 102*b* may be sealed in engagement with each other around platforms 104 and loader 108 by a clasp 112 fitting within a slot 114 to thereby seal the pipette tip platforms 104 and loader 108 within packaging 102. In the sealed position, packaging 102 may be shipped or otherwise transported with its contents maintained therein. While the clasp 112 and slot 114 form a simple but effective closure for the respective sides of packaging 102, it is understood that other types of closures may be used to seal packaging 102 for transport. Moreover, it is understood that additional locking mechanisms may be provided along the length of the sides 102*a* and 102*b* to further maintain the enclosure around the contents of packaging 102.

In embodiments, packaging 102 may be formed of an 84% post consumer recycled fiber called CCNB (clay coated news back) that is 0.020" thick. It is understood that the packaging may be formed to other thicknesses and of other fibers and other materials such as cardboard and/or plastic. All graphics on the packaging may be done in a soy based ink to eliminate heavy metals, though other printing materials are possible.

Each of the pipette tip platforms 104 may be of known construction, formed of a plastic support plate including an array of holes for storing an array of pipette tips. In embodiments, each pipette tip platform 104 may be an 8 by 12 array of 96 apertures for receiving 96 pipette tips 106. However, it is understood that the loader 108 of the present invention may be sized to work with different sized platforms and pipette tips. For example, the loader may be configured to work with platforms supporting pipette tips having volumes of 20 ul and lower, volumes of 250 ul-1 ul, and volumes of 1250 ul to 1000 ul. It is understood that the loader may be configured to work with platforms supporting pipette tips having other volumes in further embodiments.

Packaging 102 may be shipped with, for example, a tower of 13 stacked platforms 104, but it is understood that the number of stacked platforms may vary in alternative embodiments. The height of the tower within packaging 102 may vary, depending on the number of platforms 104 used, the length and diameter of the pipette tips 106 used, and whether or not the packaging is shipped with a loader 108. It is understood that the height of the contents within packaging 102 may be smaller than the height of the packaging, for example where packaging is shipped with less than the maximum number of platforms 104 than packaging 102 can hold. Once packaging 102 has reached its destination, packaging 102 may be opened into the position shown in FIGS. 1 and 2, and loader 108 may thereafter be used to remove platforms 104 from packaging 102 as explained below. It is understood that the loader 108 explained hereinafter may be used to transfer platforms from packaging 102 or locations other than packaging 102 described above.

Figure 3:
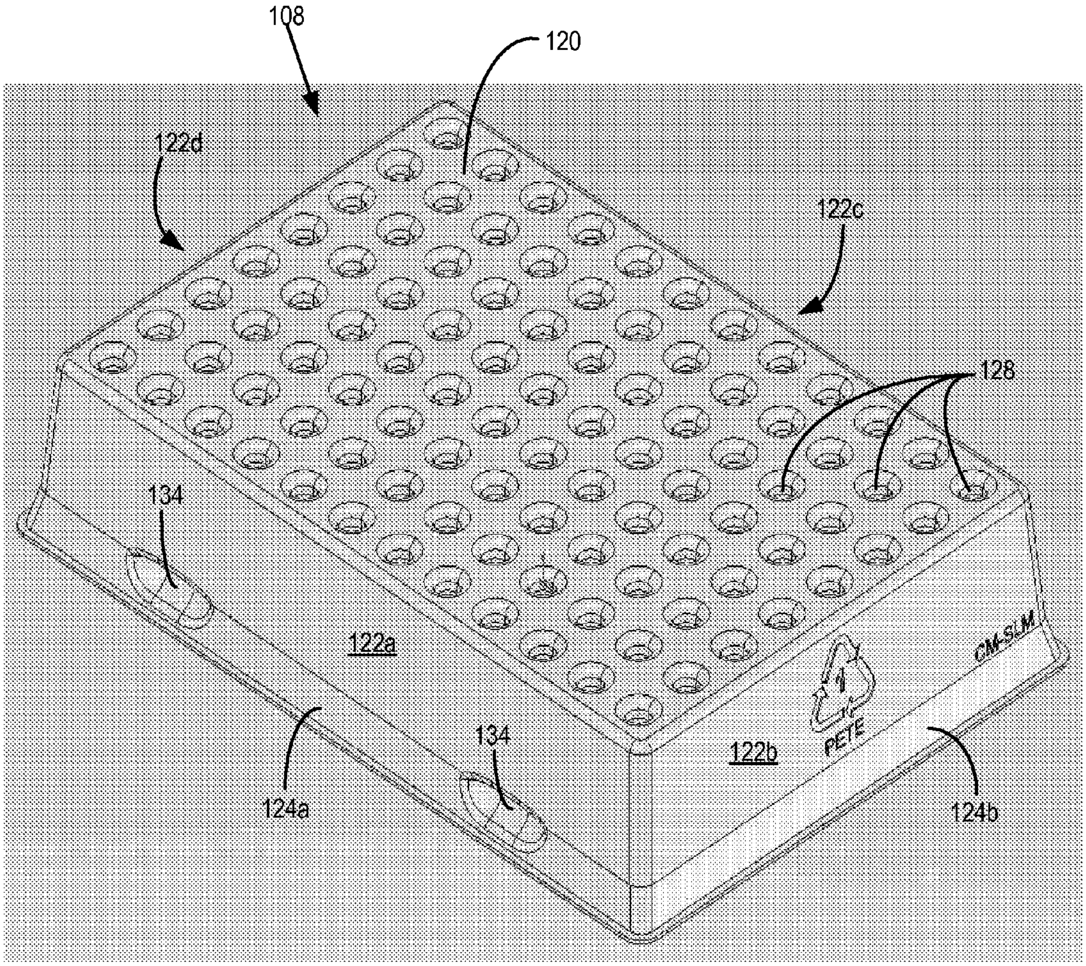
FIG. 3 is a perspective view of a loader according to embodiments of the present invention.

Referring now to FIG. 3, loader 108 in general may be formed of a clear, semi-rigid, thermoplastic polymer resin having a degree of elasticity. The loader 108 may be opaque in alternative embodiments, and the degree of elasticity may vary in alternative embodiments with the provision that the loader be capable of flexing to allow the loader to grip and release a platform 104 as explained hereinafter. Loader 108 may be formed by injection molding or other known fabrication processes, and includes a top surface 120 and four downwardly extending sides 122*a* through 122*d* (also collectively referred to as sides 122). The four respective sides 122*a-d* may include lower portions 124*a-d*, distal from top portion 120, which flare outward, the function of which is explained hereinafter. It is understood that portions of each side 122, apart from portions 124, may also flare outward, or may extend substantially perpendicularly down from top surface 120.

The top surface 120 of loader 108 may include an array of frustoconical posts 128 extending down from a top surface of loader 108 into an interior of loader 108 defined by the downwardly extending sides 122. Posts 128 are seen from their rear surfaces in FIG. 3, and are shown from their front surfaces in the cross-sectional view of FIG. 7 (showing a loader 108 of an alternative configuration as explained hereinafter). The posts 128 are arrayed within loader 108 to fit within the open upper ends of pipette tips 106 within the platform 104 being transported by loader 108 as explained hereinafter. The posts 128 help secure a platform 104 and pipette tips 106 within the loader 108 and minimize wobbling of the pipette tips 106 within the loader 108 so that the tips can be inserted into a pipette tip rack easily with a minimum of alignment difficulty. The frustoconical shape of the posts allows the loader 108 to be used with different diameter pipette tips 106.

Figure 6A:
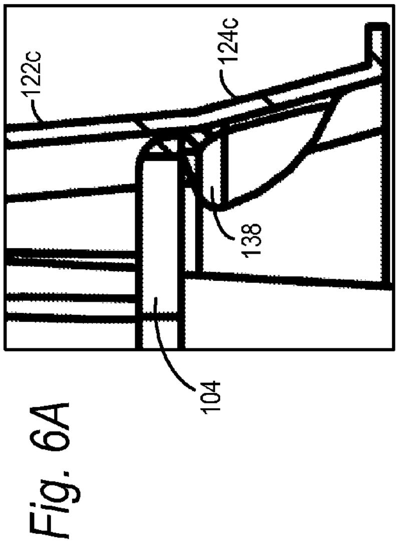
FIG. 6A is an enlarged sectional view of a portion of the loader shown in FIG. 6.
Figure 6:
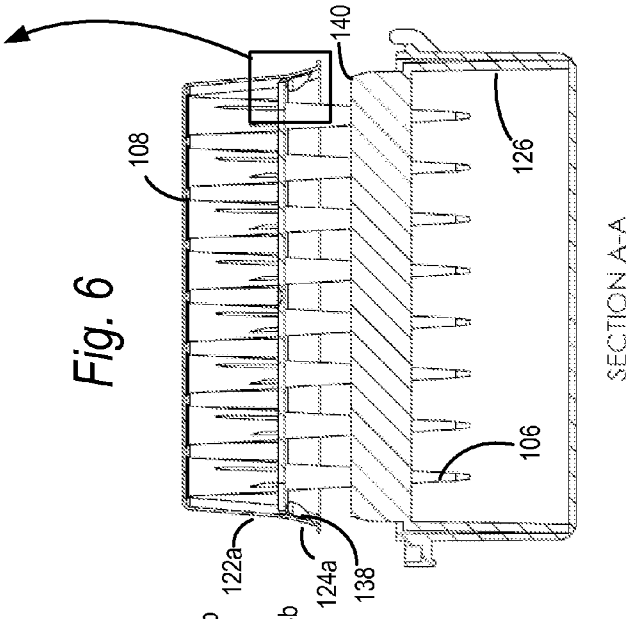
FIG. 6 is a cross-sectional view through the loader and rack of FIG. 5.

Loader 108 further includes indentations 134 formed within opposed sides 122 of the loader 108. In embodiments, each of two opposed sides 122 may include a pair of indentations, but it is understood that each of two opposed sides 122 may include a single indentation 134 or more than two indentations 134 in further embodiments of the present invention. As best seen in FIG. 6, the enlarged view of FIG. 6A and in the loader according to the alternative embodiment shown in FIGS. 7 and 8, each of the indentations 134 define a shelf 138 within the interior of loader 108. Whether sides 122 extend perpendicularly straight down from top surface 120, or flare outward from top surface 120, embodiments of the loader 108 and the respective shelves 138 within the loader 108 are sized so that, when the loader is in an unbiased position, a platform 104 is able to fit within the interior of the loader with edge portions of the platform 104 supported on each of the shelves 138 as shown in FIG. 6. When in this position, the loader 108 is able to transport a platform 104 of pipette tips 106 away from the packaging 102.

The loading of a platform 104 into loader 108 according to a first embodiment of the present invention will now be described with reference to FIGS. 1 through 3 and 5 through 6A. In operation, a force may be applied to top surface 120 of loader 108 to force the loader down over the edges of the top platform 104 in packaging 102, as shown in FIGS. 1 and 2. The loader 108 will self-align itself to the platform 104 as pressure is applied. During the downward movement of loader 108 over the edges of the platform 104, the edges of the platform engage the indentations 134, and the indentations may deform to allow the loader to continue to move down over the platform. Once the indentations are clear of the edge of the platform 104, the indentations may elastically return to their unbiased form, so that the platform 104 is then supported on each of the shelves 138. In this position, the platform 104 is secured within loader 108 and loader 108 may lift the platform off of the stack of platforms in packaging 102.

In the embodiments shown in the drawing figures, the indentations 134 and shelves 138 are provided in sides 122*a* and 122*c* to grip the platforms 104 across a width dimension of the platforms. In alternative embodiments, the indentations 134 and shelves 138 may be provided in sides 122*b* and 122*d* to grip the platforms 104 across a length dimension of the platforms.

Figure 5:
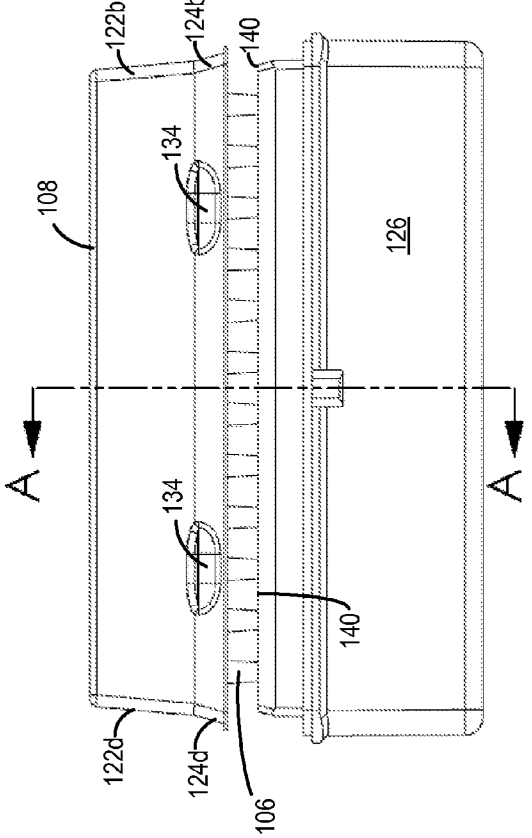
FIG. 5 is a side view of a rack and loader according to embodiments of the present invention.

Once secured within the loader 108, the platform may be lifted upward until the tips 106 are clear of the pipette tips in the next lower platform 106 (or shipping base 110 in the event of the lowermost platform). The loader 108 and platform 104 of tips 106 may then be transported to a tip rack 126 of known construction as shown in FIGS. 5 and 6. The rack 126 may include upper peripheral edges 140 around the periphery of the rack. The loader 108 is then pushed down over the rack 126, so that the pipette tips 106 seat within the respective apertures of rack 126. As the loader 108 moves down over the rack 126, the flared edges 124 will form a line of engaging contact with peripheral edges 140, at least along the sides 122 of loader 108 including the shelves 138.

Upon continued downward movement of the loader 108, the peripheral edges 140 of rack 126 will elastically force the flared portions 124 and sides 122 outward away from each other (again, at least along the sides 122 of loader 108 including the shelves 138). This spreading apart of sides 122 will also pull the shelves 138 out from under the platform 104. The sizes of the loader 108 and shelves 138 are provided so that the platform 104 is either seated on or near to being seated on the rack 126 when the peripheral edge has spread the sides 122 so that the shelves release the platform.

This type of offload of platforms presents advantages over other types of transport loaders in that a platform is extricated from the loader using a downward force and motion while the platform is securely positioned within the rack. This minimizes the possibility that pipette tips will get jostled and/or dislodged from the platform 104. In loaders which move upward while extricating the platform from the loader, it is possible that a platform will remain in the loader longer than intended. In this event, when the platform does eventually dislodge from the loader, the loader may have already separated from the rack and the platform will then fall from a distance into the rack or miss the rack completely.

Once the shelves 138 are clear of the platform 104, the platform 104 is released from loader 108 and is seated within the rack 126. The loader may then be lifted off of the rack 126 and the sides 122 return to their unbiased positions. The loader may then return to the stack of platforms in packaging 102, and the next platform may be removed and placed in a rack 126 as described above. This process may be repeated until all of the platforms are removed from packaging 102. The shipping base 110 preferably does not spread apart the sides of the loader 108, or does so minimally. Thus, the loader is able to move down over the last platform on the shipping base 110 and position the last platform on the shelves 138 without the edges of the shipping base spreading the shelves 138 wider than the width or length of the platform. The last platform may then be carried away as described above.

Figure 4:
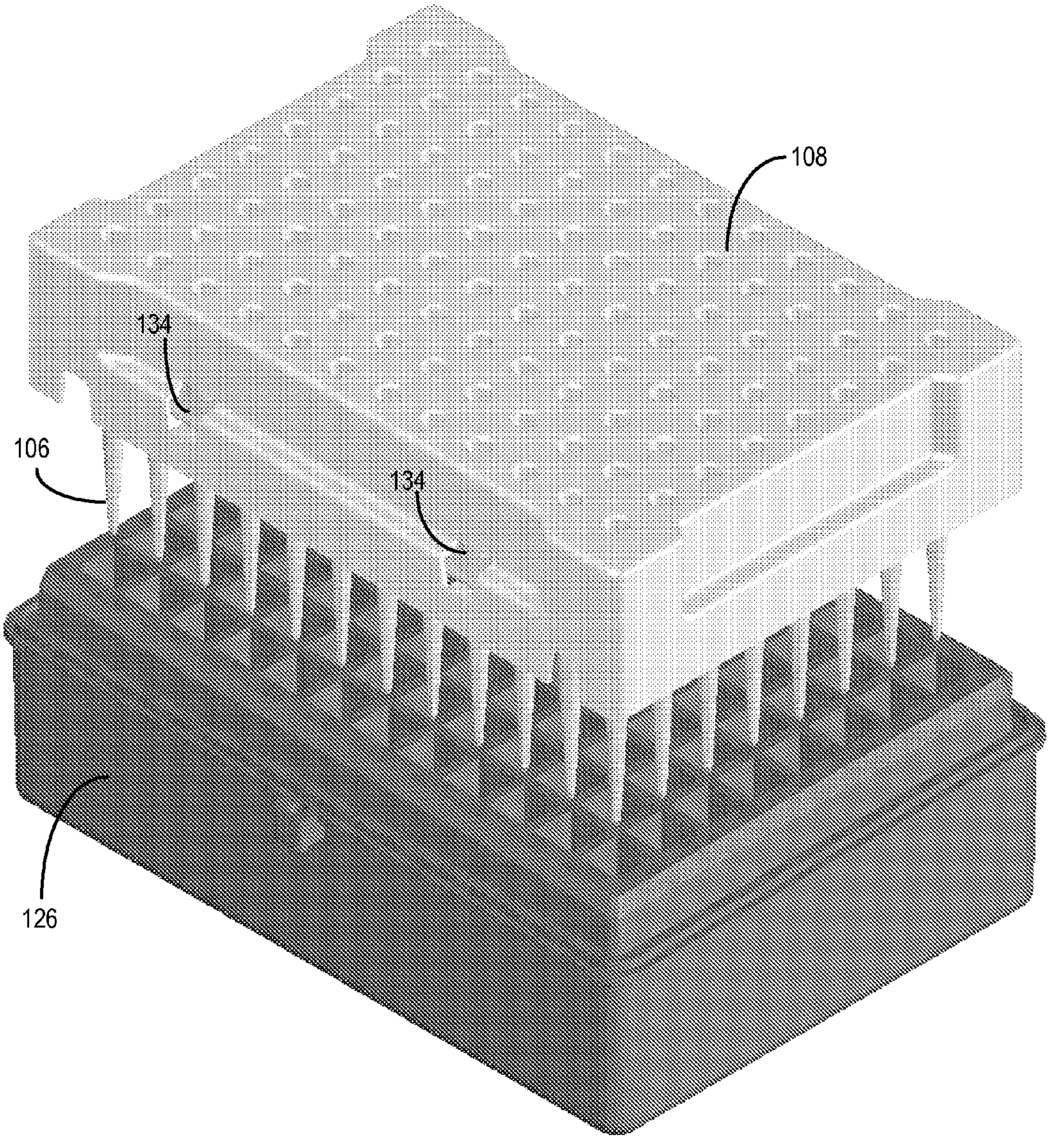
FIG. 4 is a perspective view of a loader according to an alternative embodiment of the present invention, in position over a pipette tip rack.
Figure 7:
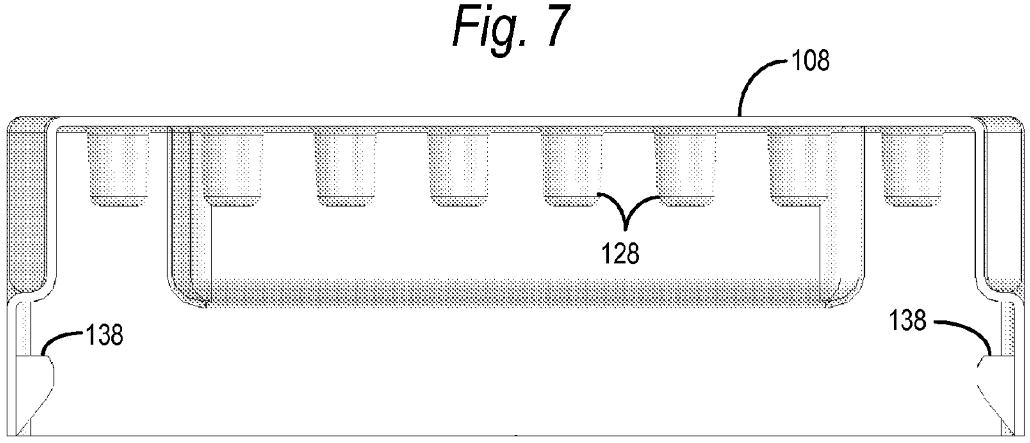
FIG. 7 is a cross-sectional view through the alternative loader of FIG. 4.
Figure 8:
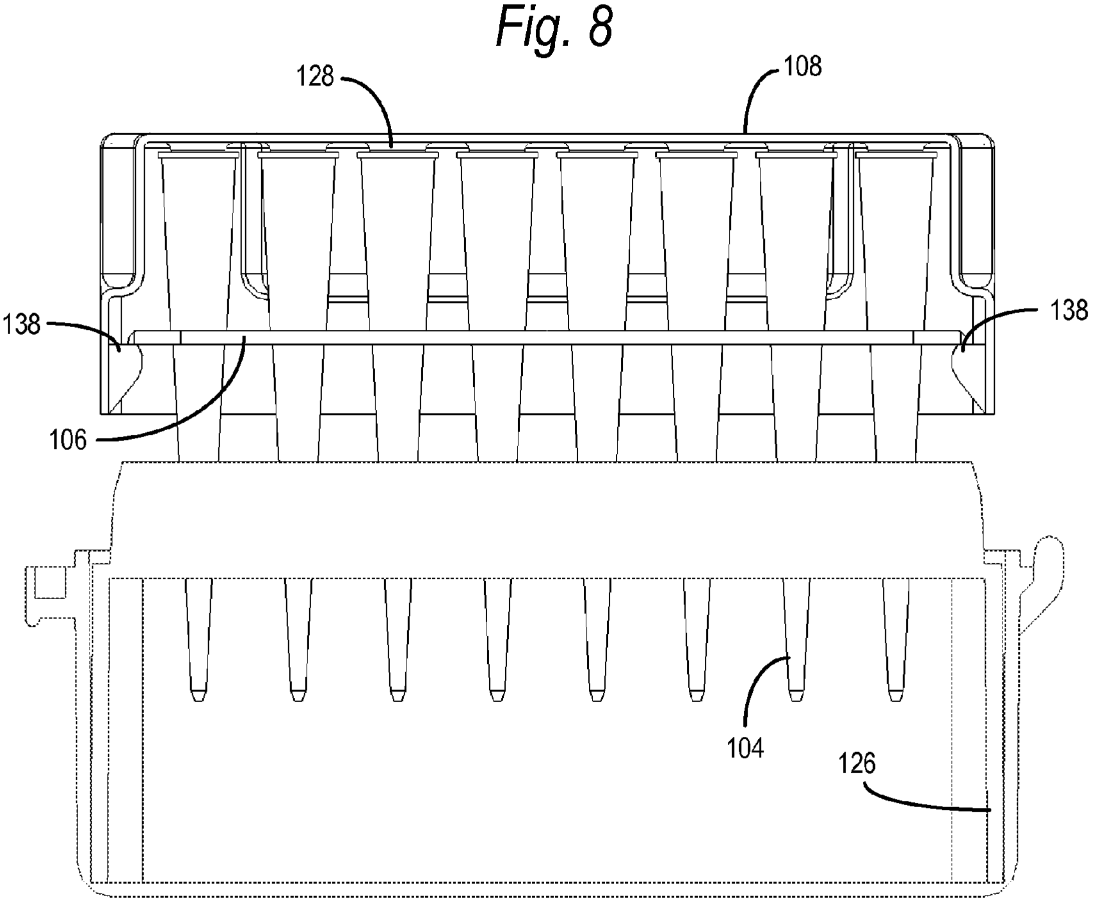
FIG. 8 is a side view of the alternative loader and rack of FIG. 4.

It is understood that loader 108 may have different configurations to load and release a platform 104 by other methods than that described above with respect to FIGS. 3, 5 and 6. For example, one alternative embodiment is shown in FIGS. 4, 7 and 8. In this embodiment, the sides 122*a-d* need not include flaring portions (though they may), and a rack 126 need not include peripheral edges that spread apart the sides of the loader 108. In the embodiment of FIGS. 4, 7 and 8, a platform 104 may be loaded into loader 108 off of the top of the stack within packaging 102 as described above in the prior embodiment. In this embodiment, the shelves may be provided in either opposed sides 122*a* and 122*c* defining the width of the loader, or in sides 122*b* and 122*d* defining the length of the loader. Once the platform is secured in the loader 108, the loader may then transport the platform 104 over to a rack 126.

In this embodiment, once a platform 104 is seated within the rack 126, the pair of sides 122 in the loader not including the indentations 134 and shelves 138 may be pinched inward toward each other. Pinching the pair of sides not including the shelves 138 will bias the pair of sides including the shelves 138 outward. Thus, by pinching the sides not including the shelves 138, the sides including the shelves 138 move outward so that the shelves 138 move clear of the platform. At this point, the platform is released to the rack 126. Once the platform 104 is released, the sides which were pinched inward may be released and the sides 122 may return to their unbiased positions.

In a further alternative embodiment, the loader 108 and shelves 138 may be sized so that, in an unbiased position, the shelves 138 on opposed sides of the loader 108 are spread apart too wide to support a platform 104 thereon. In this embodiment, the loader may be positioned over a platform 104 at the top of the stack within packaging 102. Once the loader is positioned sufficiently down over the platform so that the shelves 138 are positioned at an elevation beneath the platform 104, the opposed sides 122 of the loader including the shelves may be pinched inward to bring the shelves 138 under the platform. In this embodiment, the shelves may be provided in the opposed sides defining the length of the loader or the width of the loader.

Once the shelves 138 are biased inward to support the platform 104 thereon, the platform may be lifted and carried away from the packaging 102 to a rack 126. During transport, the sides of the loader 108 including the shelves 138 remain biased inward to maintain the platform 104 within the loader 108. Once at a rack 126, the loader may be lowered to seat the platform within the rack 126.

In this embodiment, once a platform 104 is seated within the rack 126, the pair of sides 122 in the loader including the shelves that have been biased inward may be released. The sides including the shelves then return to their unbiased positions free of the platform 104. The loader 108 may then be removed from the rack 126, leaving the platform seated within the rack.

In the embodiments described above, opposed sides of the loader included only a single tier of indentations and shelves at a given elevation of the loader. That is, when the loader is held horizontally, all of the shelves 138 in the above embodiments are substantially coplanar with each other with respect to a substantially horizontal plane through the loader. In a further embodiment of the invention, each of two opposed sides 122 of the loader may include two or more tiers of indentations and shelves at different elevations of the loader. That is, in an embodiment including two such tiers, a first set of the shelves 138 reside in a first reference plane through the loader, and a second set of the shelves 138 reside in a second reference plane through the loader substantially parallel to the first reference plane.

This alternative embodiment may serve at least two functions. First, a platform held between first and second tiers of indentations/shelves may be constrained against moving up or down within the loader during transport. Second, it is conceivable that more than one platform may be loaded into a loader at the same time, with each platform being supported on the shelves of a different tier. The multi-tiered loader embodiment may be loaded and unloaded as indicted in one or more of the above-described loader embodiments.

A loader according to any of the above-described embodiments may be used to manually load a platform and transport that platform from packaging 102 to a rack 126. It is alternatively conceivable that a robotic assembly may be provided which would grip and bias the loader as described in the above embodiments to load a platform and transport that platform from packaging 102 to a rack 126.

While the loader described above has been described as off-loading a single platform to a given rack 126, it is understood that the loader may be used to off-load a plurality of platforms to a single rack in a stacked configuration. Thus, for example, a loader according to embodiments of the present invention may load a plurality of platforms into a shipping base 110 within packaging 102. Once the loader has loaded a number of stacked packages, the packaging may be sealed as described above and transported.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. A system for transporting platforms having pipette tips, the system comprising:

a packaging in which the platforms and pipette tips are stacked, the packaging including first and second partial enclosures attached to each other and defining a generally vertically oriented opening between the first and second partial enclosures, the first and second partial enclosures capable of moving between an open position where the platforms are exposed from within the packaging and a closed position where the first and second partial enclosures engage each other to enclose the platforms and pipette tips; and a loader configured to transfer an uppermost platform from the packaging, the loader having a support structure including:

an upper surface, a plurality of sides extending from the upper surface, the plurality of sides each having an inner surface and an outer surface, at least a portion of a pair of opposed sides of the plurality of sides flaring outward from the upper surface, a shelf on the inner surface of each of a pair of opposed sides that flare inward toward a center of the loader, a distance between the shelves in the opposed sides being less than a distance between the pair of opposed edges of the platform when the support structure is in an unbiased position, the shelves in the opposed sides capable of being biased away from each other to a distance greater than the distance between the pair of opposed edges of the platform.

2. A system as recited in claim 1, wherein the shelves in the opposed sides are capable of being biased away from each other by forces exerted outward on the inner surface of the sides including outwardly flaring portions.

3. A system as recited in claim 1, wherein the uppermost platform is capable of being loaded into the loader when the shelves in the opposed sides are biased away from each other to a distance greater than or equal to the distance between the pair of opposed edges of the platform.

4. A system as recited in claim 3, wherein the uppermost platform is supported on the shelves in the opposed sides of the support structure after the uppermost platform is loaded into the loader and the opposed sides return to their unbiased positions.

5. A system as recited in claim 4, wherein the uppermost platform is secured within the support structure when supported on the shelves and the support structure is in an unbiased position.

6. A system as recited in claim 4, wherein the uppermost platform is released from within the support structure when the shelves in the opposed sides are biased away from each other by forces exerted outward on the inner surface of the sides including outwardly flaring portions.

7. A system as recited in claim 1, wherein the sides including the flared portions are capable of engaging a rack for receiving the uppermost platform.

8. A system as recited in claim 7, wherein the sides including the flared portions are biased outward away from each other upon a downward force on the upper surface when the flared portions of the sides engage the rack.

9. A system as recited in claim 1, wherein the packaging is formed of post consumer recycled fiber.

10. A system for transporting platforms having pipette tips, the system comprising:

a packaging in which the platforms and pipette tips are stacked, the packaging including first and second partial enclosures attached to each other, the first and second partial enclosures capable of moving between an open position where at least an uppermost platform and a lowermost platform, different than the uppermost platform, are exposed from within the packaging, and a closed position where the first and second partial enclosures engage each other to enclose the platforms and pipette tips; and a loader configured to transfer an uppermost platform from the packaging, the loader having a support structure including:

an upper surface, a plurality of sides extending from the upper surface, the plurality of sides each having an inner surface and an outer surface, at least a portion of a pair of opposed sides of the plurality of sides flaring outward from the upper surface, a shelf on the inner surface of each of a pair of opposed sides that flare inward toward a center of the loader, a distance between the shelves in the opposed sides being less than a distance between the pair of opposed edges of the platform when the support structure is in an unbiased position, the shelves in the opposed sides capable of being biased away from each other to a distance greater than the distance between the pair of opposed edges of the platform.

11. A system as recited in claim 10, wherein the shelves in the opposed sides are capable of being biased away from each other by forces exerted outward on the inner surface of the sides including outwardly flaring portions.

12. A system as recited in claim 10, wherein the uppermost platform is capable of being loaded into the loader when the shelves in the opposed sides are biased away from each other to a distance greater than or equal to the distance between the pair of opposed edges of the platform.

13. A system as recited in claim 12, wherein the uppermost platform is supported on the shelves in the opposed sides of the support structure after the uppermost platform is loaded into the loader and the opposed sides return to their unbiased positions.

14. A system as recited in claim 13, wherein the uppermost platform is secured within the support structure when supported on the shelves and the support structure is in an unbiased position.

15. A system as recited in claim 13, wherein the uppermost platform is released from within the support structure when the shelves in the opposed sides are biased away from each other by forces exerted outward on the inner surface of the sides including outwardly flaring portions.

16. A system as recited in claim 10, wherein the sides including the flared portions are capable of engaging a rack for receiving the uppermost platform.

17. A system as recited in claim 16, wherein the sides including the flared portions are biased outward away from each other upon a downward force on the upper surface when the flared portions of the sides engage the rack.

18. A system as recited in claim 10, wherein the packaging is formed of post consumer recycled fiber.

* * * * *